(12) United States Patent
Lin et al.

(10) Patent No.: US 8,774,630 B2
(45) Date of Patent: Jul. 8, 2014

(54) METHOD, APPARATUS, AND SYSTEM FOR A SELF-SEEDED EXTERNAL CAVITY LASER FOR DENSE WAVELENGTH DIVISION MULTIPLEXING APPLICATIONS

(75) Inventors: Huafeng Lin, Shenzhen (CN); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 75 days.

(21) Appl. No.: 13/272,359

(22) Filed: Oct. 13, 2011

(65) Prior Publication Data

US 2012/0093515 A1 Apr. 19, 2012

Related U.S. Application Data

(60) Provisional application No. 61/393,573, filed on Oct. 15, 2010.

(51) Int. Cl.
*H04J 14/00* (2006.01)
*H04J 14/02* (2006.01)
*H04B 10/50* (2013.01)

(52) U.S. Cl.
CPC ......... *H04J 14/0282* (2013.01); *H04J 14/0252* (2013.01); *H04J 14/0247* (2013.01); *H04B 10/506* (2013.01); *H04J 14/0246* (2013.01); *H04J 14/0265* (2013.01)
USPC .................. 398/72; 398/68; 398/79; 398/160; 398/100; 398/159; 359/337; 359/341; 385/24; 385/37

(58) Field of Classification Search
USPC ......... 398/66, 67, 68, 69, 70, 71, 98, 99, 100, 398/74, 75, 76, 77, 78, 82, 79, 84, 85, 87, 398/158, 159, 81, 160, 168, 169, 170, 72, 398/58; 359/344, 337, 341; 385/24, 37
See application file for complete search history.

(56) References Cited

U.S. PATENT DOCUMENTS 5,812,567 A 9/1998 Jeon et al.
(Continued)

FOREIGN PATENT DOCUMENTS

| CN | 1972035 A | 5/2007 |
|---|---|---|
| CN | 101426154 A | 5/2009 |
| CN | 101777727 A | 7/2010 |
| CN | 102136674 A | 7/2011 |

OTHER PUBLICATIONS

Martinelli, "A Universal Compensator for Polarization Changes Induced by Birefringence on a Retracing Beam," Optics Communications, vol. 72, Issue 6, Aug. 15, 1989, pp. 341-344.

(Continued)

*Primary Examiner* — Hanh Phan
(74) *Attorney, Agent, or Firm* — Conley Rose, P.C.; Grant Rodolph; Jonathan K. Polk

(57) ABSTRACT

A network apparatus comprising an optical gain medium, a wavelength division multiplexing (WDM) filter coupled to the optical gain medium, and a Faraday Rotator Mirror (FRM) coupled to the WDM, and wherein the optical gain medium, the WDM filter, and the FRM are coupled by single mode fibers to form a self-seeded external cavity laser for a DWDM wavelength channel.

22 Claims, 9 Drawing Sheets

(56) References Cited

U.S. PATENT DOCUMENTS

| | | | |
|---|---|---|---|
| 6,049,415 | A | 4/2000 | Grubb et al. |
| 6,483,628 | B1 | 11/2002 | Digonnet et al. |
| 7,738,167 | B2 * | 6/2010 | Kim et al. .................. 359/344 |
| 7,773,838 | B2 * | 8/2010 | Lee et al. .................. 385/24 |
| 8,417,118 | B2 * | 4/2013 | Bai .................. 398/65 |
| 2004/0067059 | A1 | 4/2004 | Song et al. |
| 2010/0284693 | A1 * | 11/2010 | Agmon et al. .................. 398/65 |
| 2011/0129227 | A1 * | 6/2011 | Wen et al. .................. 398/82 |
| 2011/0222857 | A1 * | 9/2011 | Wen et al. .................. 398/79 |

OTHER PUBLICATIONS

Hann, et al. "Direct-Modulated Upstream Signal Transmission Using a Self-Injection Locked F-P LD for WDM-PON," ECOC2005, 2 pages.

Foreign Communication From a Related Counterpart Application, PCT Application PCT/CN2011/080824, International Search Report dated Jan. 19, 2012, 5 pages.

Foreign Communication From a Related Counterpart Application, PCT Application PCT/CN2011/080824, Written Opinion dated Jan. 19, 2012, 8 pages.

* cited by examiner

METHOD, APPARATUS, AND SYSTEM FOR A SELF-SEEDED EXTERNAL CAVITY LASER FOR DENSE WAVELENGTH DIVISION MULTIPLEXING APPLICATIONS

CROSS-REFERENCE TO RELATED APPLICATIONS

The present application claims the benefit of U.S. Provisional Patent Application No. 61/393,573 filed Oct. 15, 2010 by Huafeng Lin at al. and entitled "Upgrade Method and Related System of Time Division Multiplexing-Passive Optical Network Based Fiber to the Building System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at a central office, an optical distribution network (ODN), and a plurality of optical network terminal (ONTs) or optical network units (ONUs) at customer side. An ONT is a single integrated electronics unit that terminates the PON and presents native service interfaces to the user. An ONU is the PON-side half of the ONT, terminating the PON, and may present one or more converged interfaces, such as xDSL or Ethernet, toward the user. An ONU typically requires a separate subscriber unit to provide native user services such as telephony, Ethernet data, or video. In some PON systems, such as Gigabit PON (GPON) systems, downstream data is broadcasted at about 2.5 Gigabits per second (Gbps) while upstream data is transmitted at about 1.25 Gbps. However, the bandwidth capability of the PON systems is expected to increase as the demand for services increase. To meet the increased demand in services, some emerging PON systems, such as Next Generation Access (NGA) systems, are being reconfigured to transport the data frames with improved reliability and efficiency at higher bandwidths, for example at about ten Gbps.

SUMMARY

In one embodiment, the disclosure includes a network apparatus comprising an optical gain medium, a wavelength division multiplexing (WDM) filter coupled to the optical gain medium, and a Faraday Rotator Mirror (FRM) coupled to the WDM, and wherein the optical gain medium, the WDM filter, and the FRM are coupled by single mode fibers to form a self-seeded external cavity laser for a DWDM wavelength channel.

In another embodiment, the disclosure includes a method to set up a self-seeded external cavity fiber laser, comprising transmitting wide band light using an optical gain medium, filtering the transmitted light using a WDM filter that has a determined pass-band wavelength, reflecting a portion of the filtered light using a Faraday Rotator Mirror (FRM) back to the optical gain medium to achieve gain, and transmitting a remaining portion of the filtered light from the FRM as an DWDM wavelength channel.

In a third aspect, the disclosure includes a network system comprising a power splitter based TDM-PON optical distribution network (ODN), and a plurality of MxUs comprising PON ONU optical modules as the uplink transceivers, wherein the plurality of MxUs are coupled to the TDM-PON ODN, wherein at least some of the PON ONU optical modules of MxUs are WDM-PON ONU optical modules, and at lest some of the PON ONU optical modules of MxUs are TDM-PON ONU optical modules.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

With growing subscribers demand for broadband, Gigabit PONs (GPONs) and Ethernet PONs (EPONs) are becoming more widely and increasingly deployed. In order to take advantage of deployed legacy copper resource and further to avoid substantial cost of rebuilding connectivity lines in existing buildings, carriers may extend the PON fibers to the extent of the building or curb (cabinet), e.g., as a first step of a fiber to the home (FTTH) architecture. As such, existing legacy systems, such as copper wire systems, may be used to establish connectivity from the building or cabinet to the home, and this is known as a Fiber to the Building (FTTB) or a Fiber to the Curb (FTTC) MxU system solution.

Figure 1:
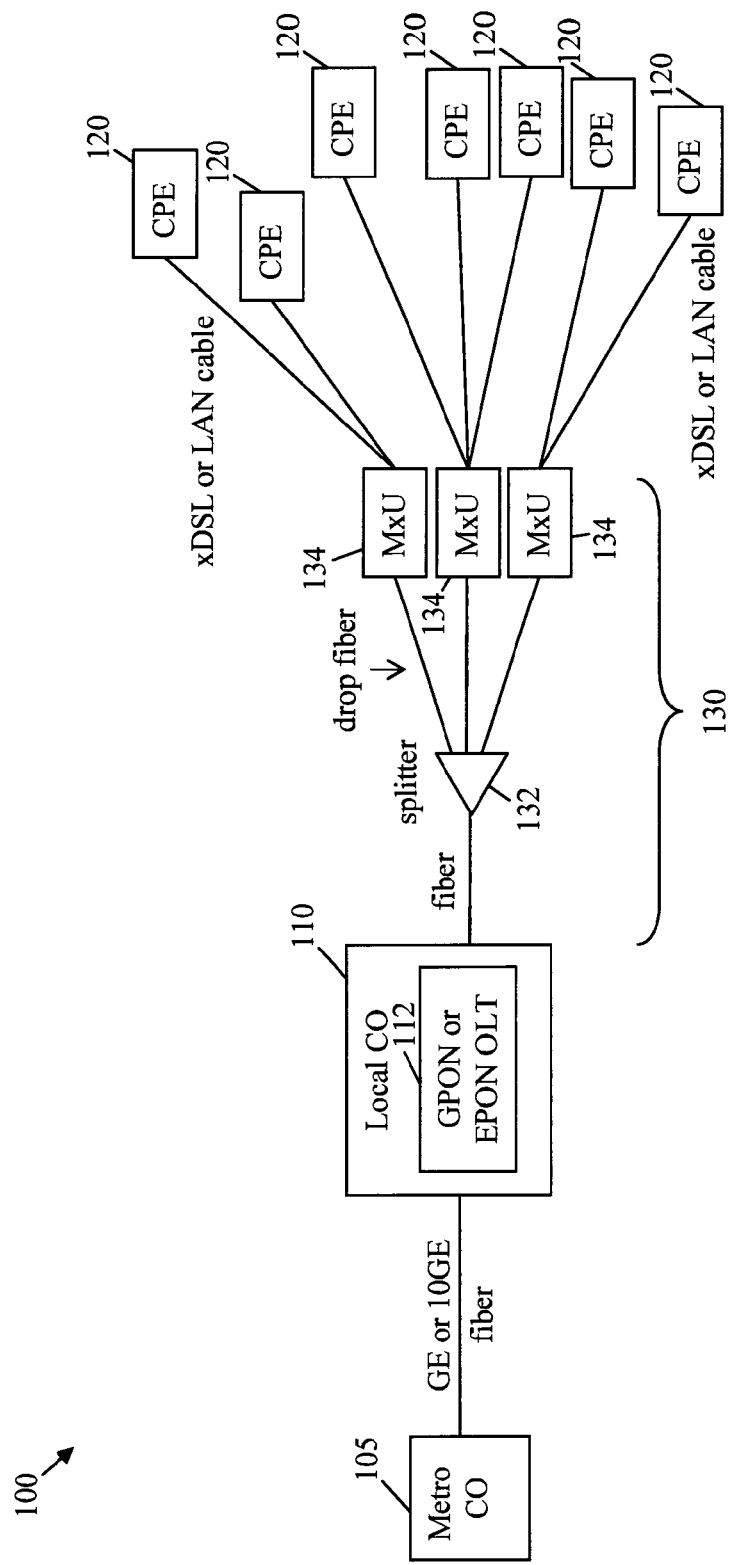
FIG. 1 is a schematic diagram of a prior-art embodiment of a GPON or EPON based FTTB MxU system.

FIG. 1 illustrates an embodiment of a typical GPON or EPON based FTTB MxU system 100. The GPON or EPON based FTTB MxU system 100 comprises two sections: one is an optical transmission section based on TDM-PON system, such as a GPON or an EPON, and another is a copper based transmission section, such as xDSL, Ethernet. The TDM-PON system may comprise fibers extended between a central office and multiple buildings, basements, and/or distribution cabinets. The copper line infrastructure may be part of a legacy system that includes twisted copper lines from the buildings, basements, and/or distribution cabinets to a plurality of home units for subscribers. The TDM-PON system uses a TDM scheme to share bandwidth between a plurality of MxUs. The TDM-PON may allocate a plurality of time slots (within a periodic or reoccurring time window) to different MxUs. As such, the full available bandwidth may be used to establish communications with each MxUs at the corresponding allocated time slots.

The TDM-PON system may comprise an OLT 112, which may be located at a local Central Office (CO) 110. The local CO 110 may be one of a plurality of local COs that are coupled to a metro CO 105. The local CO 110 may be coupled to the metro CO 105 via Gigabit Ethernet (GE) or 10G Ethernet. The TDM-PON may also comprise a plurality of ONU optical modules (not shown) each integrated with or located at a corresponding MxU 134. The ONU optical modules at the MxUs 134 may be coupled to the OLT 112 at the local CO 110 via an ODN 130. The copper lines may be twisted copper wires, cables, cat 5 wires, or combinations thereof that are used as final media to transport data from the MxUs 134 to subscribers' homes. Each MxUs 134 may be coupled to one or more CPEs 120 at the subscribers' homes. The components of GPON or EPON based FTTB MxU system 100 may be arranged as shown in FIG. 1.

The GPON or EPON may be a communications network that does not require any active components to distribute data between the OLT 112 and the ONU optical modules at the MxUs 134. Instead, the GPON or EPON may use passive optical components in the ODN 130 to distribute data between the OLT 112 and the ONU optical modules at the MxUs 134. The OLT 112 may send data received from a metro CO to the ONU optical modules at the MxUs 134, and send data received from the ONU optical modules at the MxUs 134 to the other network. When the transmission protocol between a local CO and a metro CO is different from the transmission protocol used in the optical transmission section based on TDM-PON system, such as Ethernet or Synchronous optical networking (SONET)/synchronous digital hierarchy (SDH), the OLT 112 may comprise a protocol converter. The OLT 112 may also comprise a traffic convergence or aggregation processor.

The ODN 130 may be an optical signal power distribution infrastructure that comprises feed fibers, at least one splitter 132, distribution/drops fibers, and/or passive optical components/equipment. The ODN 130 may typically extend from the OLT 112 to the ONU optical modules at the MxUs 134 in a fan-out configuration as shown in FIG. 1, but may be alternatively configured in any other configuration.

The ONU optical modules integrated with or located at the MxUs 134 may be any devices that are configured to communicate with the OLT 112. Specifically, the ONU optical modules may act as an intermediary between the OLT 112 and the remaining components of the MxUs 134. For instance, the ONUs optical modules may send data received from the OLT 112 to the remaining components of the MxUs 134, and send data received from the remaining components of the MxUs 134 to the OLT 112. Although the specific configuration of the ONU optical modules may vary depending on the type of PON, the ONU optical modules may comprise an optical transmitter configured to send optical signals to the OLT 112 and an optical receiver configured to receive optical signals from the OLT 112. Additionally, the ONU optical modules may comprise a converter that converts the optical signals into electrical signals and vice versa for the remaining components of the MxUs 134, such as electrical signals in the GPON or EPON protocol. The remaining components of the MxUs 134 may comprise a second transmitter and receiver (transceiver) that may exchange the electrical signals with the CPEs. The MxUs 134 may act as the medium convertor and convergent devices between the OLT 112 and the CPEs 120.

In the embodiment in FIG. 1, all of the ONUs at the MxUs 134 may share the downstream and/or upstream bandwidth using TDM. Such a PON system is known as a power splitter based TDM-PON system. The CPEs 120 coupled to each MxU 134 may further share the corresponding ONU bandwidth for the MxU 134 via the MxU convergence function.

The MxU 134 in GPON or EPON based FTTB MxU system 100 may have a three mode MAC (GPON MAC, EPON MAC, and GE MAC). That means that the MxU 134 may automatically support/adapt/interface any type of optical modules: GPON ONU optical module, EPON ONU optical module, or GE optical module.

In the case of a splitting ratio of about 32 for the OLT 112, the average downstream bandwidth for a GPON based MxU 134 may be about 78 Megabit per second (Mbps). The about 78 Mbps bandwidth at each GPON based MxU 134 may be further shared among all CPEs 120 that are serviced by the same GPON based MxU 134. For example, if the GPON based MxU 134 services about 24 CPEs 120, then the downstream average bandwidth for each of the CPEs 120 coupled to that GPON based MxU 134 may be about 3 Mbps. Alternatively, the average downstream bandwidth for an EPON based MxU 134 may be about 31 Mbps, and the downstream average bandwidth for each of the CPEs 120 that share the same EPON based MxU 134 may be about 1.3 Mbps.

The bandwidth demand of subscribers may continue increasing as more bandwidth demanding applications emerge, e.g., IP television (IPTV), online video conferencing, online file transfer, video sharing, network storage backup, and other real-time applications. Thus, about 3 Mbps downstream and about 1.3 Mbps upstream average bandwidth (of current GPON or EPON based FTTB/FTTC MxU system) may not be sufficient to meet emerging or future customer bandwidth requirements. GPON or EPON based FTTB/FTTC MxU system 100 may face substantial challenges to satisfy future user demands for bandwidth.

Disclosed herein are apparatuses, methods, and systems for improving and upgrading the existing GPON or EPON based FTTB/FTTC MxU system to increase bandwidth. The apparatuses, methods, and systems may comprise a self-seeded external cavity laser based transmitter and a related optical. The self-seeded external cavity laser based transmitter and related optical module may be used at the MxU to upgrade the uplink bandwidth capacity by a WDM (Wavelength Division Multiplexing) scheme. The systems and methods may upgrade such existing GPON or EPON based FTTB/FTTC MxU systems without an optical outside plant change, i.e., without an ODN change.

The apparatus, methods, and systems may replace the GPON or EPON ONU optical module with a GE optical module, and hence improve uplink bandwidth of MxU to 1 G symmetric and dedicated bandwidth.

Figure 2:
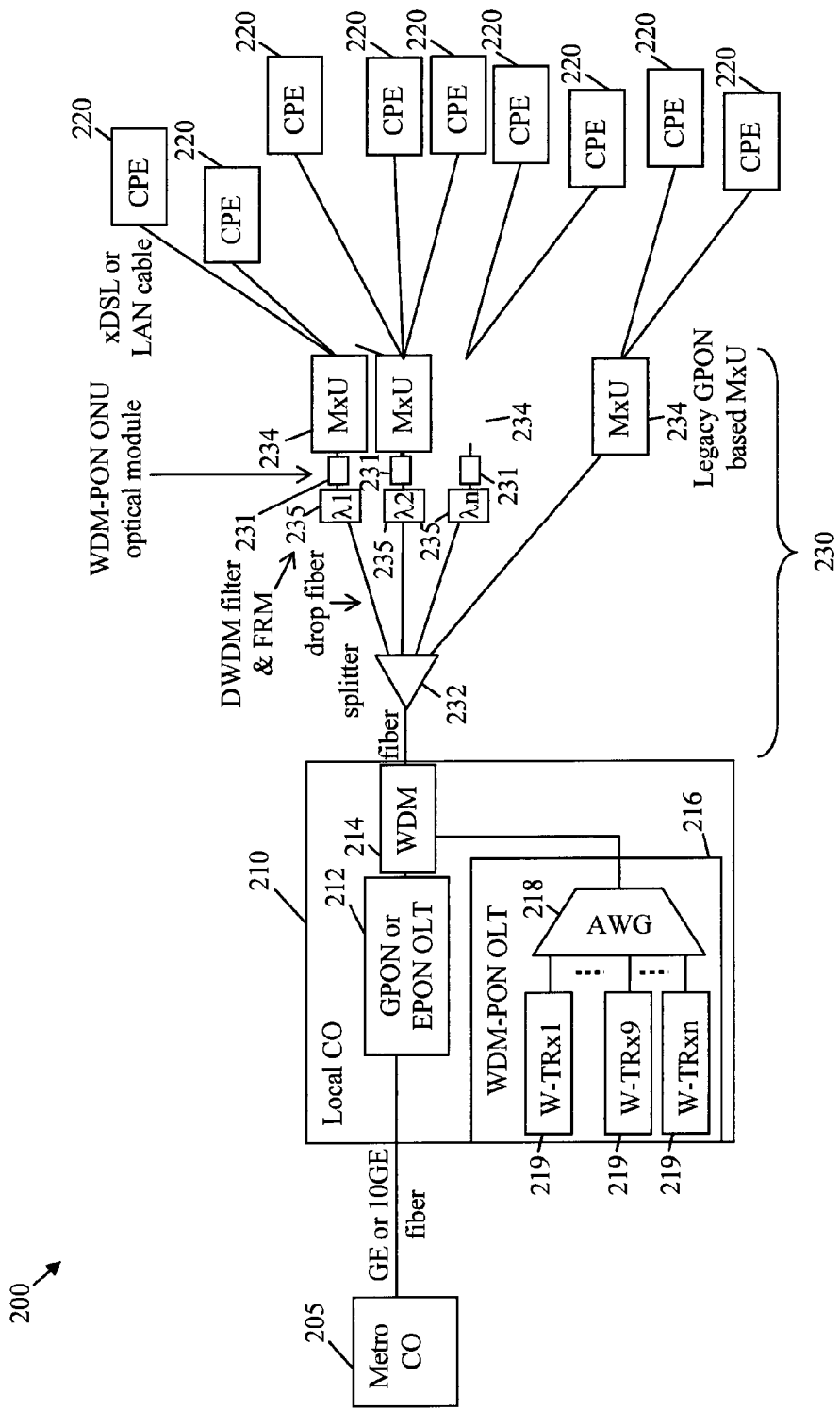
FIG. 2 is a schematic diagram of an embodiment of WDM-PON based FTTB MxU system with uplink bandwidth upgrade by WDM technologies according to this disclosure.

FIG. 2 illustrates an embodiment of a WDM-PON based FTTB/FTTC MxU system with an uplink bandwidth upgrade by WDM technologies according to this disclosure. The WDM-PON based FTTB/FTTC MxU system 200 may comprise a GPON or an EPON OLT 212. The local CO 210 may also comprise WDM-PON OLTs 216 and WDM coupler 214 which couple both GPON or EPON OLT 212 and WDM-PON OLT 216 to the power splitter based ODN 230. The local CO 210 may be coupled via the ODN 230 to a plurality of MxUs 234. Each of the MxUs 234 may be coupled to one or more CPEs 220 at the subscribers' homes. The OLT 212 may communicate with at least some of the GPON or EPON ONU optical modules at the MxUs 234 similar to the OLT 112 and the ONU optical modules at the MxUs 134. At least some of the MxUs 234 may be upgraded by replacing the GPON or EPON ONU optical module with a WDM-PON ONU optical module. The WDM-PON ONU optical module may be coupled to a WDM filter and a FRM pair 235. The components of WDM-PON based FTTB/FTTC MxU system 200 may be arranged as shown in FIG. 2.

The GPON or EPON OLT 212 at the local CO 210 may send/receive downstream/upstream at 1,490 nm (nanometer)/1,310 nm to/from the MxUs 234. The WDM-PON OLT 216 maybe configured to send/receive downstream/upstream at L-band (from 1565 nm to 1625 nm)/C-band (from 1,530 nm to 1,565 nm)/to/from the MxUs 234. The WDM-PON OLT 216 may comprise a plurality of WDM transceivers 219 (e.g., W-TRx1 . . . W-TRxn, where n is an integer) coupled in parallel to an Arrayed Waveguide Grating (AWG) 218 that is coupled to the WDM coupler 214. Each of the WDM transceivers 219 may send/receive one of the wavelength channels which may be multiplexed/de-multiplexed by the AWG 218. The WDM-PON wavelength channels may be sent/received at about the same time using the WDM scheme and each channel may use the full available bandwidth in the fiber. As such, the upstream and downstream data for each WDM wavelength channel may be transmitted in continuous (uninterrupted) mode. The WDM MUX 214 may be configured to multiplex the EPON/GPON and WDM-PON downstream wavelength channels and send the wavelength channels to the MxUs 234. The WDM MUX 214 may also receive the upstream (uplink) wavelength channels from the MxUs 234, separate the upstream wavelength channels, and send the EPON/GPON wavelength channels to the OLT 212 and the WDM-PON wavelength channels to the WDM-PON OLT 216.

The ONU optical modules at the MXUs 234 may receive the downstream wavelength channels from the local CO 210 and send the upstream wavelength channels on the corresponding uplinks to the local CO 210. The upgraded MxUs 234 may communicate with the WDM-PON OLT 216 via the WDM-PON wavelength channels and the remaining MxUs 234 may communicate with the OLT 212 via the GPON/EPON wavelength channels. The GPON or EPON ONU optical modules at the non-upgraded MxUs 234 (e.g., legacy GPON/EPON based MxUs) may comprise Wavelength Blocking Filters (WBFs) that block the WDM-PON wavelength channels and allow only the EPON/GPON downstream wavelength channels to pass through.

The WDM filter and FRM pair 235 at the upgraded MxUs 234 may comprise a WDM filter, which may be a Dense Wavelength Division Multiplexing (DWDM) filter, and a FRM comprising a partial reflective (mirror) surface facing the WDM filter. The WDM or DWDM filter may be positioned between the WDM-PON ONU optical module 231 and the FRM. The WDM filter may be configured to allow only one of the WDM-PON wavelength channels (e.g., between about 1,530 nm and about 1,565 nm) to pass between the upgraded MxU 234 and the local CO 210. This may implement a WDM scheme for communications with a plurality of upgraded MxUs 234, where each upgraded MxU 234 may exchange upstream and downstream data with one corresponding WDM transceiver 219 at a selected WDM wavelength channel. The FRM may also be configured to reflect at least a portion of the light transmitted from the WDM-PON ONU optical module to support a self-seeded laser/transmitter operation at the corresponding upgraded MxU 234, as described in more detail below.

Specifically, the FRM, DWDM filter, and a RSOA or optical gain medium at the WDM-PON ONU optical module 231 may be coupled by standard single mode fibers to form a self-seeded external cavity fiber laser based transmitter, which may be used as the laser transmitter of the WDM-PON ONU optical module. The WDM-PON ONU optical module 231 may also comprise an optical receiver similar to a standard GE optical module. However, unlike the standard GE optical module, the self-seeded laser of the WDM-PON ONU optical module 231 may have an operation wavelength that is determined by the external WDM or DWDM filter. Thus, the WDM-PON ONU optical module 231 may be colorless and may not have a fixed wavelength operation. The wavelength operation of the WDM-PON ONU optical module 231 may be selected by selecting the appropriate WDM or DWDM filter (according to a desired WDM wavelength channel). Because the MxU 234 can support any one of the three MACs (GPON MAC, EPON MAC, or Gigabit Ethernet MAC), the uplink bandwidth of the MxU 234 may be upgraded to obtain a symmetrical about 1.25 G or even higher by replacing a GPON or EPON ONU optical module in a MxU 234 with a WDM-PON ONU optical module 231, and during the upgrade, the MxU 234 and ODN 230 infrastructure may be reused. This may only require replacing a pluggable small form-factor pluggable (SFP) GPON or EPON ONU optical module with the WDM-PON ONU optical module 231 in the MxU 234 and adding the passive WDM or DWDM filter and FRM between the WDM-PON ONU optical module and the distribution/drop fiber of splitter.

Figure 3:
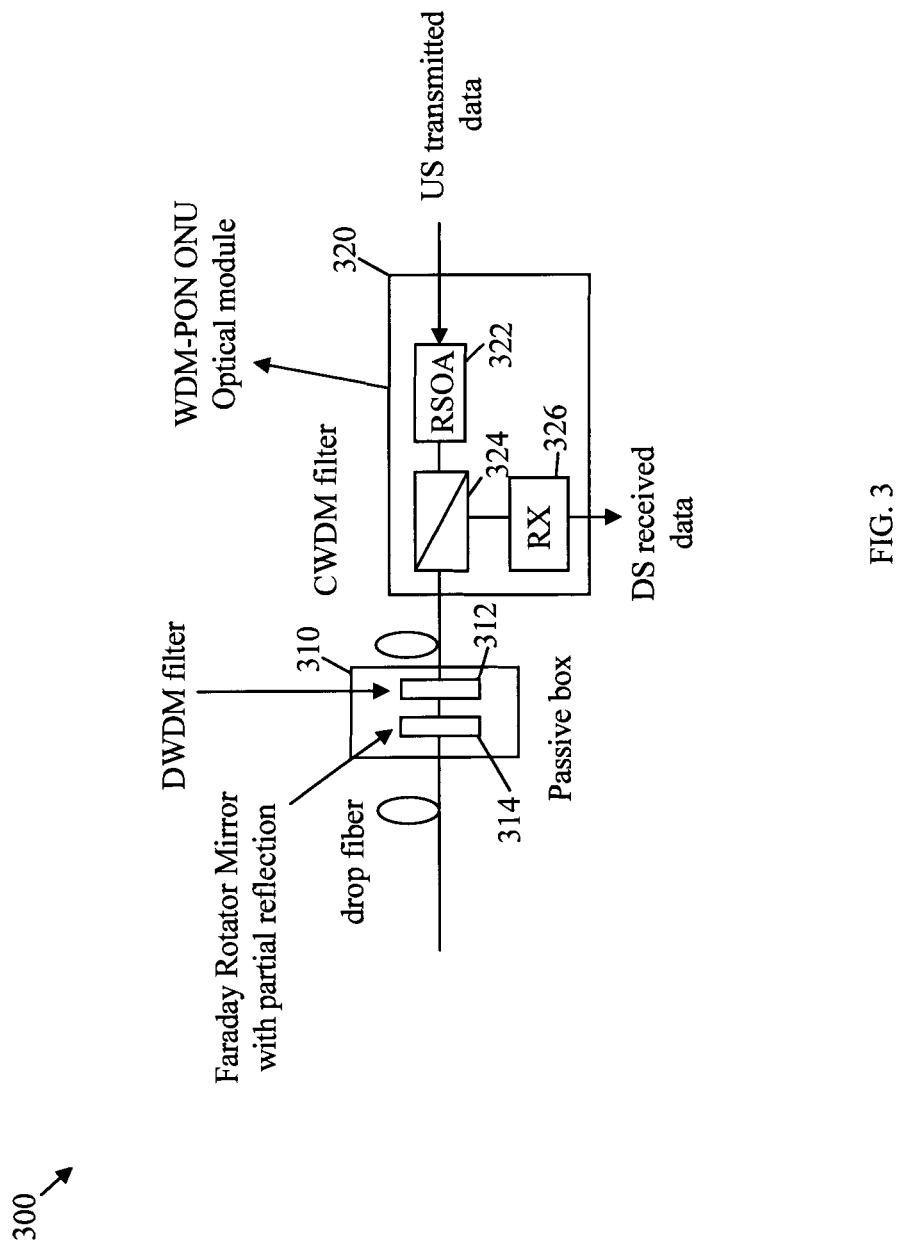
FIG. 3 is a schematic diagram of an embodiment of a WDM-PON ONU optical module apparatus according to this disclosure.

FIG. 3 illustrates an embodiment of a WDM-PON ONU optical module apparatus 300 that may be used in a MxU to upgrade the MxU uplink, such as for the upgraded MxU 234. The WDM-PON ONU optical module apparatus 300 may comprise a passive box 310 coupled to a WDM-PON ONU optical module 320. The passive box 310 may be coupled to the drop fiber (of the ODN) and inserted between the WDM-PON ONU optical module 320 and the power splitter of the ODN (not shown). The passive box 310 may comprise a DWDM filter 312 (on the side of the WDM-PON ONU optical module 320) and a FRM 314 (on the side of the fiber), which may correspond to the WDM filter and FRM pair 235 in FIG. 2. The WDM-PON ONU optical module 320 may correspond to the WDM-PON ONU optical module in the upgraded MxU 234. The components of the WDM-PON ONU optical module apparatus 300 may be arranged as shown in FIG. 3.

The WDM-PON ONU optical module 320 may comprise a second WDM or coarse WDM (CWDM) filter 324, an optical receiver (RX) 326, and a RSOA or an optical gain medium 322. The CWDM filter 324 may be coupled to the passive box 310 via the fiber and to the receiver 326 and RSOA 322. The FRM 314, DWDM filter 312, and RSOA 322 may be coupled by fibers to form a self-seeded external cavity fiber laser based transmitter that may have an operation wavelength determined by the DWDM filter 312. For example, the DWDM filter 312 may be a Gaussian filter with a width of about 200 Gigahertz (GHz), 100 GHz, or 50 GHz. The DWDM filter 312 may be configured to have cyclic/free spectral range (FSR) feature to allow both downstream and upstream wavelength channels (optical signals) to share the same fiber port. The RSOA 322 may act as both an optical gain medium and modulator, and the FRM 314 may be used to stabilize the polarization of the external cavity fiber laser. The RSOA 322 may be used to transmit upstream data, which may be sent from the remaining components of the MxU. The output of the RSOA 322 may be forwarded by the CWDM filter 324 towards the passive box 310. The CWDM filter 324 may also route incoming (downstream) optical signals to the receiver 326, which may then further forward the downstream received data to the remaining components of the MxU. The CWDM filter 324 pass-band wavelength may be designed to match with the DWDM filter 312 pass-band wavelength, although the CWDM filter 324 pass-band wavelength may be substantially wider. The FRM 314 and the DWDM filter 312 may also be designed to allow incoming downstream optical signals to pass through towards the receiver 326.

An amplified spontaneous emission (ASE) of the RSOA or optical gain medium 322 may be filtered and passed by the DWDM filter 312 and partially reflected back by the FRM 314. The reflected ASE light may be injected back into the RSOA 322 for amplification. If the gain of the RSOA 322 is greater than the entire round trip loss (between the RSOA 322 and the FRM 314), then (after multiple rounds of round-trip resonation) the output at the FRM 314 and the output of the RSOA 322 may become stable and may be used to carry the upstream optical signal or data. Since the operation wavelength of the RSOA 322 may be determined by DWDM filter 312 pass-band wavelength, then the WDM-PON ONU optical module 320 may be colorless. This may reduce inventory, cost, and/or maintenance issues for ONU optical module and MxU.

In the WDM-PON based FTTB MxU system with uplink bandwidth upgrade, such as the PON based configuration 200, uplink upgrade for the MxUs may be achieved one by one and in a "pay as you grow" way. For instance, the splitter based ODN may be kept unchanged while the passive DWDM filter and FRM may be added and coupled to the distribution/drop fibers of the ODN's power splitter. The impact of splitting loss introduced by the power splitter (of the ODN) on the power budget of the WDM-PON system may be reduced due to three factors. First, the colorless laser transmitter (RSOA) of the WDM-PON ONU optical module may be self-seeded and hence no centralized seed light may be required or transmitted from the WDP-PON OLT to the transmitter at the WDM-PON ONU optical module; in the conventional case of ASE injected injection locking Fabry Perot-Laser Diode (FP-LD) or ASE injected RSOA, the seed light may be subject to loss at the splitter. Second, the transmitter and receiver of the WDM-PON ONU optical module and the WDM-PON OLT may be operated at continuous mode instead of burst mode, since no TDMA (Time Division Multiple Access) is needed to separate channels. This may lead to improved receiving sensitivity at the ONU optical modules and the OLT TRx. Third, the WDM-PON system may further integrate some electrical or signal processing technologies to enhance the transmission performance and power budget, such as equalizer, FEC (Forward Error Correction).

Figure 4:
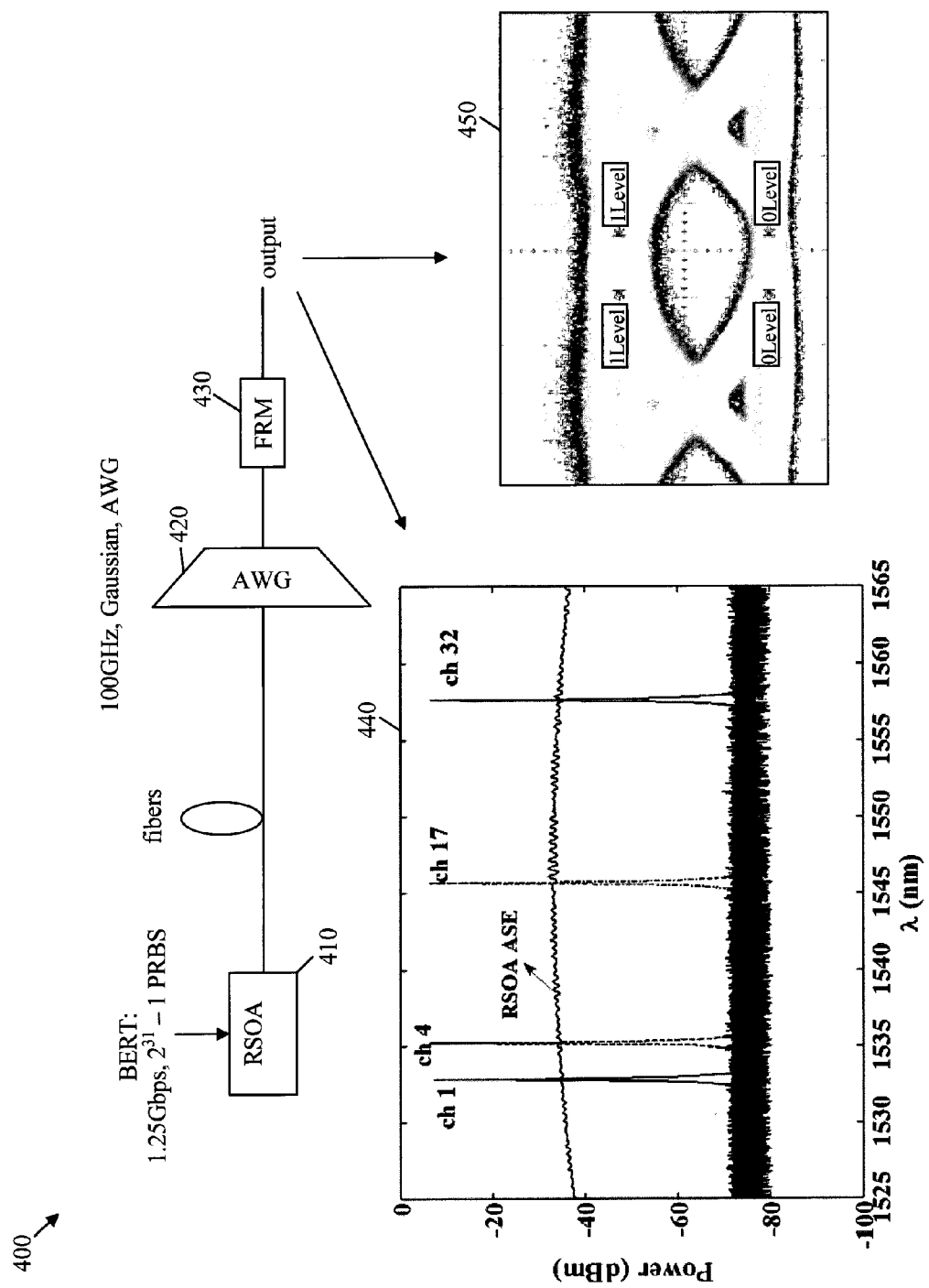
FIG. 4 is a schematic diagram of an embodiment of output characteristics of a self-seeded external cavity laser based transmitter according to this disclosure.

FIG. 4 illustrates an embodiment of output characteristics for a self-seeded external cavity laser based transmitter apparatus 400. The self-seeded external cavity laser based transmitter apparatus may comprise a RSOA or optical gain medium 410 coupled via a fiber to an AWG 420 and a FRM 430. The RSOA 410 and FRM 430 may have similar optical and spectral properties as the RSOA and FRM used in the WDM-PON ONU optical module apparatus at an upgraded MxU, as described above. The AWG 420 may serve the same function as a DWDM filter of determining the output wavelength of the RSOA 410. The laser output characteristics comprise a spectra 440 and eye diagram 450 of the self-seeded external cavity fiber laser based transmitter. The spectra 440 shows a graph that includes multiple peak wavelength generated by the self-seeded external cavity laser under different channels of AWG. Any of the output wavelength may be aligned or matched with a DWDM filter pass-band. The eye diagram 450 also reveals a sufficiently "wide" eye pattern that indicates a sufficiently high signal to noise ratio.

Figure 5:
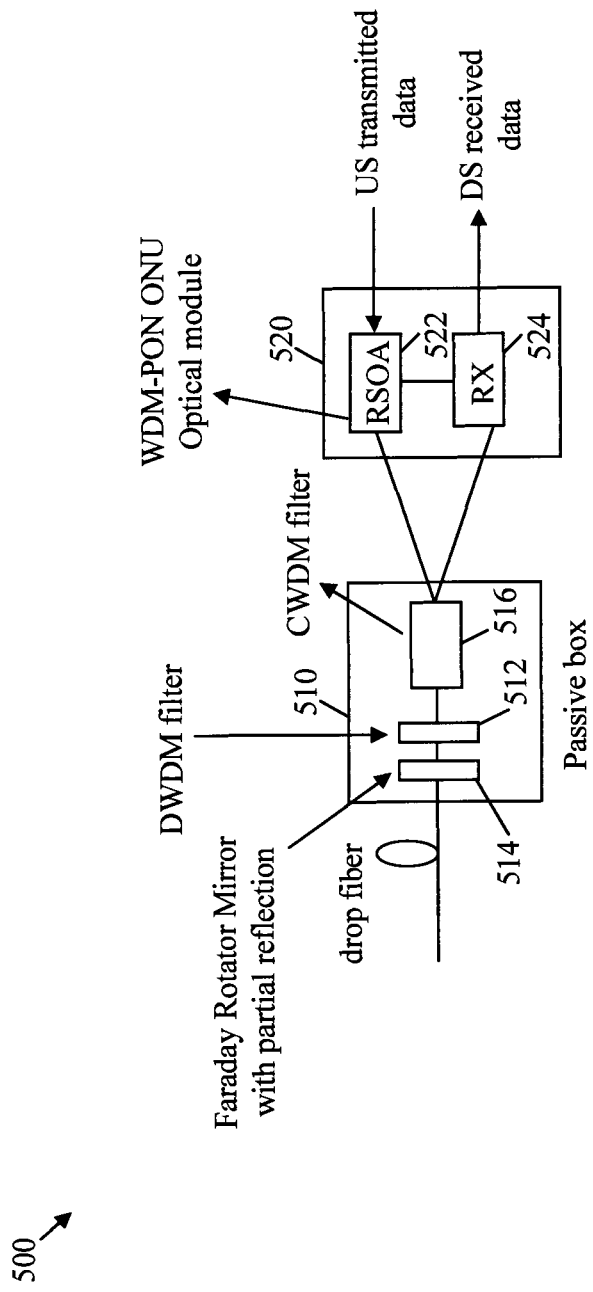
FIG. 5 is a schematic diagram of another embodiment of a WDM-PON ONU module according to this disclosure.

FIG. 5 illustrates an embodiment of another WDM-PON ONU optical module apparatus 500 that may be used in a MxU to upgrade the MxU uplink, such as for the upgraded MxU 234. The WDM-PON ONU optical module apparatus 500 may comprise a passive box 510 coupled to a WDM-PON ONU optical module 520. The passive box 510 may be coupled to the distribution or drop fiber (of ODN power splitter) and inserted between the WDM-PON ONU optical module 520 and the ODN power splitter (not shown). The passive box 510 may comprise a DWDM filter 512 (on the side of the WDM-PON ONU optical module 520) and a FRM 514 (on the side of the distribution or drop fiber), which may correspond to the WDM filter and FRM pair 235. The passive box 510 may also comprise a CWDM filter 516 coupled (via two fibers) to the WDM-PON ONU optical module 520. The WDM-PON ONU optical module 520 may correspond to the WDM-PON ONU optical module in the upgraded MxU 234. The components of the WDM-PON ONU optical module apparatus 500 may be arranged as shown in FIG. 5.

The FRM 514, the DWDM filter 512 and CWDM filter 516 may be located at about the same position or in sufficiently close proximity at the MxU. In this case, the CWDM filter 516 may be integrated in the passive box 510 with the DWDM filter 512 and the FRM 514 (instead of integrated in the WDM-PON ONU optical module 520). The CWDM filter 516 in the passive box 510 may be coupled via two separate fibers to a RSOA 522 and a receiver 524 in the WDM-PON ONU optical module 520. As such, the input and output of the WDM-PON ONU optical module 520 may be each unidirectional and not single-fiber bidirectional (BIDI) as in the case of the WDM-PON ONU optical module apparatus 300.

Figure 6:
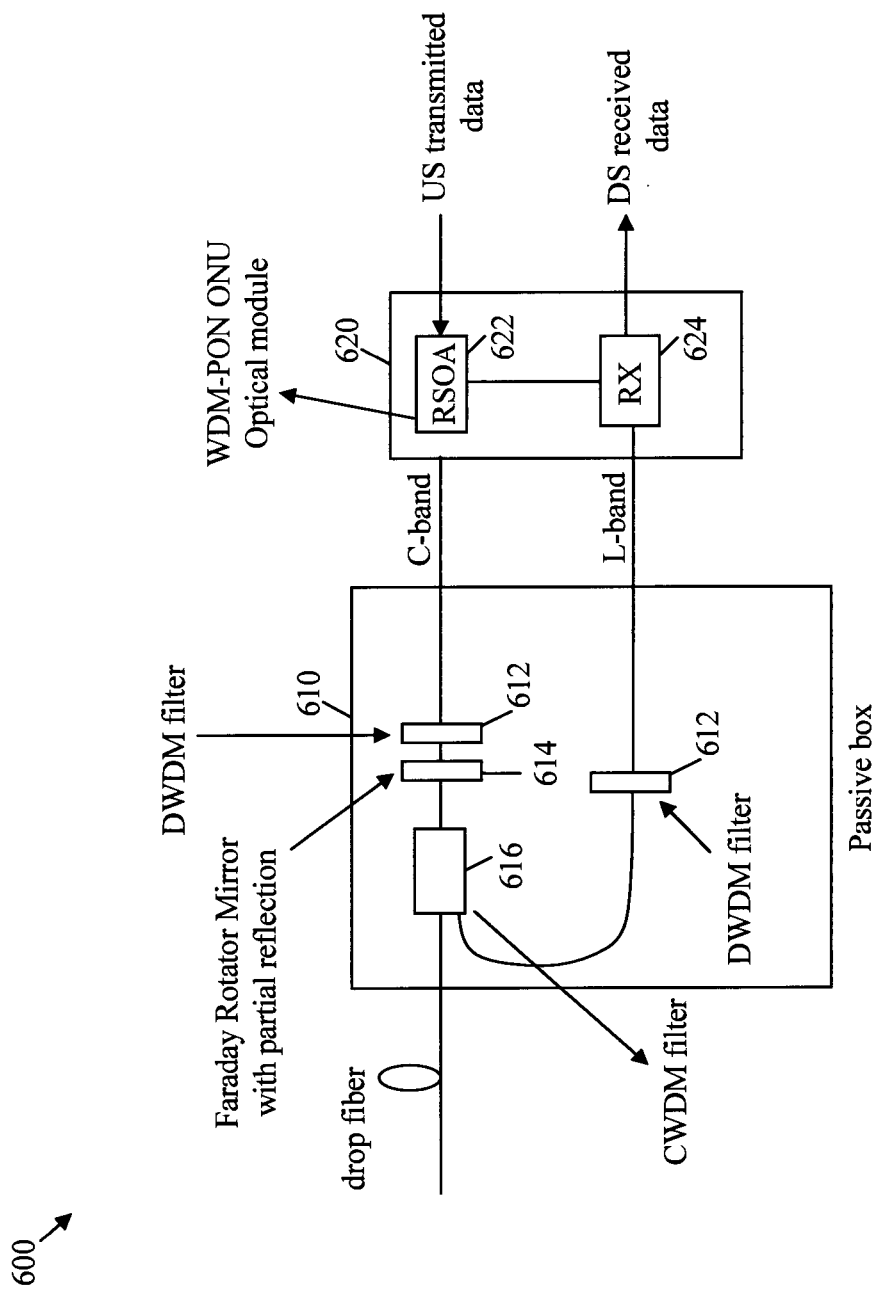
FIG. 6 is a schematic diagram of another embodiment of a WDM-PON ONU module according to this disclosure.

In some applications, a cyclic DWDM filter may not be applicable. In this case, another separate DWDM filter may be needed in the WDM-PON ONU optical module, and the position of the CWDM filter may also be adjusted. FIG. 6 illustrates an embodiment of another WDM-PON ONU optical module apparatus 600 that may be used in a MxU to upgrade the MXU uplink, such as for the upgraded MxU 234. The WDM-PON ONU optical module apparatus 600 may be used in the case where a cyclic DWDM filter is not applicable. The WDM-PON ONU optical module apparatus 600 may comprise a passive box 610 coupled to a WDM-PON ONU optical module 620. The passive box 610 may be coupled to the distribution or drop fiber (of the ODN power splitter) and inserted between the WDM-PON ONU optical module 620 and the ODN power splitter (not shown). The WDM-PON ONU optical module 620 may correspond to the WDM-PON ONU optical module in the upgraded MxU 234.

The passive box 610 may comprise a first DWDM filter 612 (on the side of the WDM-PON ONU optical module 620) and a FRM 614 (on the side of the distribution or drop fiber). The passive box 610 may also comprise a CWDM filter 616 coupled (between the drop fiber and the FRM 614). The passive box may also comprise a second DWDM filter 612 (on the side of the WDM-PON ONU optical module 620), which may be coupled to the CWDM 616. As such, the first DWDM filter 612 may be coupled to a RSOA 622 in the WDM-PON ONU optical module 620, and the second DWDM 612 may be coupled to a receiver 624 in the WDM-PON ONU optical module 620. The first DWDM filter 612 and the second DWDM filter 612 may be configured to support multiple ports (wavelengths) to satisfy different bandwidth capacity requirement. Thus, the first DWDM filter 612 and the second DWDM filter 612 may have different pass-band wavelengths. For example, the first DWDM filter 612 may allow the transmission of a C-Band DWDM channel, and the second DWDM filter 612 may allow the pass of a L-band DWDM channel. The components of the WDM-PON ONU optical module apparatus 600 may be arranged as shown in FIG. 6.

In other embodiments, other arrangements of the components of the WDM-PON ONU optical module apparatus for the upgraded MxU may be implemented. For instance, at least some of the components may be relocated while maintaining the general concept of operating the self-seeded external cavity laser based transmitter. Further, the components may be packaged as described above, may be intergraded onto one or more optical/circuit boards, or combinations of both.

Figure 7:
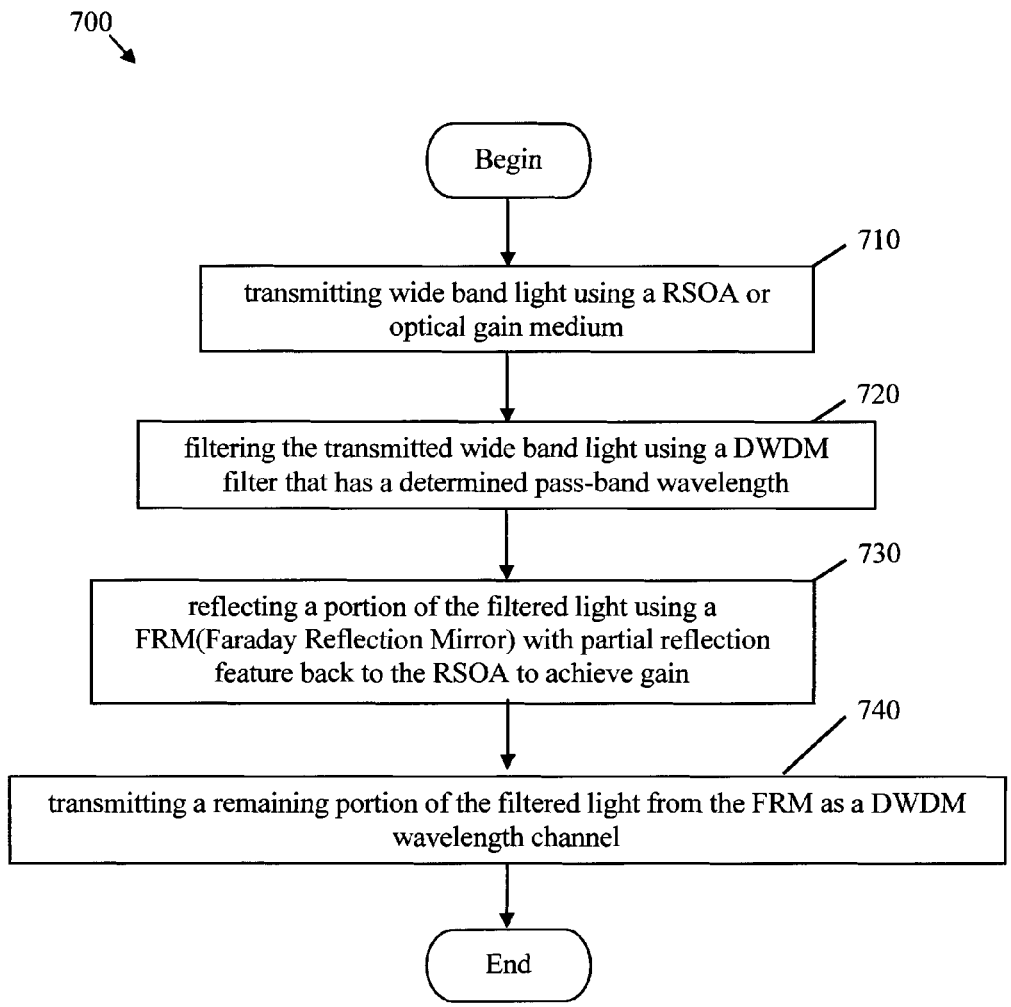
FIG. 7 is a schematic diagram of an embodiment of a method to set up a self-seeded external cavity laser based transmitter according to this disclosure.

FIG. 7 illustrates an embodiment of a method 700 to set up a self-seeded external cavity fiber laser based transmitter. The method 700 may be implemented using the components of a self-seeded external cavity laser based transmitter for the WDM ONU optical module. The self-seeded external cavity laser based transmitter components may comprise a RSOA, A DWDM filter, a FRM. The method 700 may begin at block 710, where transmitting wide band light using a RSOA or optical gain medium with modulation function. At block 720, the transmitted wide band light may be filtered using a selected DWDM filter that has a determined pass-band wavelength. At block 730, a portion of the filtered light may be reflected back to the RSOA to achieve gain by a FRM. The reflected light may also pass through the DWDM filter on the path back to the RSOA. At block 740, a remaining portion of the filtered light may be transmitted from the FRM. The transmitted optical light may have been modulated by user data. The method 700 may then end.

Figure 8:
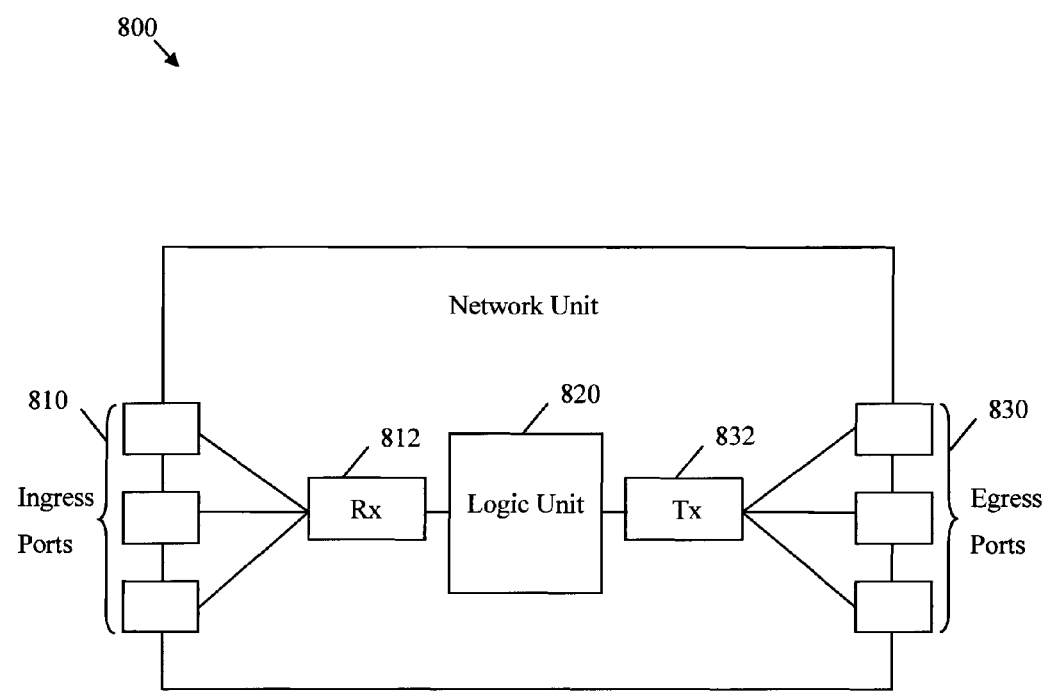
FIG. 8 is a schematic diagram of an embodiment of a network unit.

FIG. 8 illustrates an embodiment of a network unit 800, which may be any device that routes data or packets in a network. For instance, the network unit 800 may be located in a router or any network component that exchanges or communicates data with other components. The network unit 800 may comprise one or more ingress ports 810 coupled to a receiver 812 (Rx), which may be configured for receiving data, packets, or frames from other components. The network unit 800 may comprise a logic unit or processor 820 coupled to the receiver 812 and configured to process the data or otherwise determine to which components to send the data. The logic unit or processor 820 may be implemented using hardware, software, or both. The network unit 800 may also comprise one or more egress ports 830 coupled to a transmitter 832 (Tx), which may be configured for transmitting data, packets, or frames to other components. The network unit 800 may be configured to implement at least some of the disclosed methods, systems, and devices.

Figure 9:
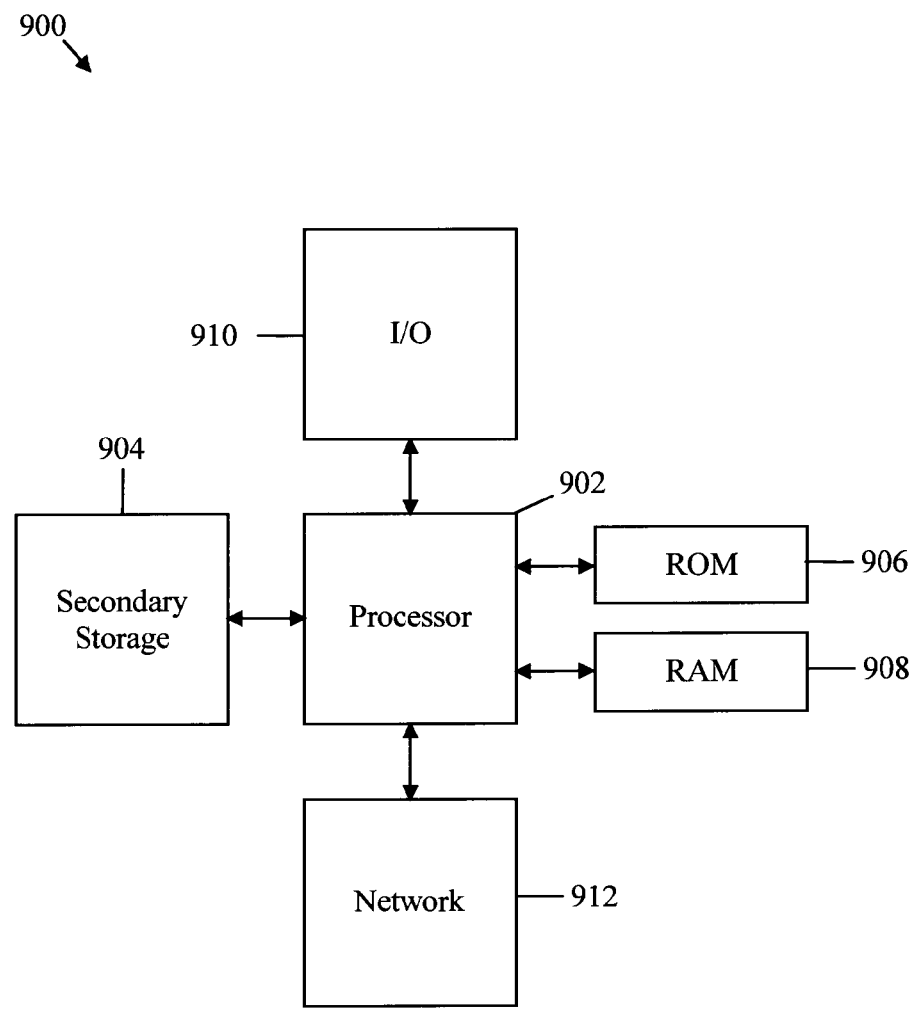
FIG. 9 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 9 illustrates a typical, general-purpose network component 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor 902 may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network apparatus comprising:
an optical gain medium;
a wavelength division multiplexing (WDM) filter coupled to the optical gain medium;
a Faraday Rotator Mirror (FRM) coupled to the WDM, wherein the optical gain medium, the WDM filter, and the FRM are coupled to form a self-seeded external cavity laser for a dense WDM (DWDM) wavelength channel; and
a coarse WDM (CWDM) filter coupled to the WDM filter and the optical gain medium.

2. The network apparatus of claim 1, wherein the optical gain medium comprises a data modulation function.

3. The network apparatus of claim 2, wherein the self-seeded external cavity laser forms a transmitter for a DWDM wavelength channel.

4. The network apparatus of claim 1, further comprising:
an optical receiver coupled to the CWDM filter;
a passive box comprising the FRM and the WDM filter; and
an optical module comprising the CWDM filter, optical gain medium, and optical receiver,
wherein the WDM filter comprises a DWDM filter,
wherein the DWDM filter is positioned between the FRM and the CWDM filter, and
wherein the CWDM filter is positioned between the DWDM filter and the optical gain medium.

5. The network apparatus of claim 1, wherein the WDM filter comprises a DWDM Gaussian filter, and wherein the network apparatus is part of an optical network unit (ONU).

6. The network apparatus of claim 1, further comprising:
an optical receiver coupled to the CWDM filter and the optical gain medium;
a passive box comprising the FRM, WDM filter, and CWDM filter; and
an optical module comprising the optical gain medium and the optical receiver,
wherein the FRM is partially reflective,
wherein the WDM filter is positioned between the FRM and the CWDM filter, and
wherein the CWDM filter is positioned between the WDM filter on the one hand and the optical gain medium and the optical receiver on the other hand.

7. The network apparatus of claim 1, wherein the optical gain medium, the WDM filter, and the FRM are coupled by at least one single mode fiber.

8. A network apparatus comprising:
an optical gain medium;
a wavelength division multiplexing (WDM) filter coupled to the optical gain medium;
a Faraday Rotator Mirror (FRM) coupled to the WDM, wherein the optical gain medium, the WDM filter, and the FRM are coupled to form a self-seeded external cavity laser for a dense WDM (DWDM) wavelength channel;
a coarse WDM (CWDM) filter coupled to the FRM;
a dense WDM (DWDM) filter coupled to the CWDM filter;
an optical receiver coupled to the DWDM filter and the optical gain medium;
a passive box comprising the CWDM filter, FRM, WDM filter, and DWDM filter; and
an optical module comprising the optical gain medium and the optical receiver,
wherein the optical gain medium comprises a reflective semiconductor optical amplifier (RSOA),
wherein the CWDM filter is positioned between the DWDM filter and the FRM,
wherein the FRM is positioned between the CWDM filter and the WDM filter,
wherein the WDM filter is positioned between the FRM and the RSOA, and
wherein the DWDM filter is positioned between the CWDM filter and the optical receiver.

9. A method to set up a self-seeded external cavity fiber laser, comprising:
transmitting wide band light using an optical gain medium;
forwarding the transmitted light using a coarse wavelength-division multiplexing (CWDM) filter;
filtering the forwarded light using a wavelength division multiplexing (WDM) filter that has a predetermined pass-band wavelength;
reflecting, using a Faraday Rotator Mirror (FRM), a portion of the filtered light back to the optical gain medium to achieve gain; and
transmitting a remaining portion of the filtered light from the FRM as a dense WDM (DWDM) wavelength channel, wherein an apparatus comprises the optical gain medium, WDM filter, and FRM.

10. The method of claim 9, further comprising modulating the optical gain medium with user data.

11. The method of claim 9, further comprising filtering the transmitted light using a Gaussian DWDM filter that has a determined pass-band wavelength.

12. The method of claim 9, wherein the optical gain medium comprises a reflective semiconductor optical amplifier (RSOA).

13. A network system comprising:
a power splitter based time-division multiplexing (TDM) passive optical network (PON) optical distribution network (ODN); and
a plurality of MxUs comprising PON optical network unit (ONU) optical modules as the uplink transceivers, wherein the plurality of MxUs are coupled to the TDM PON ODN,
wherein at least some of the PON ONU optical modules of the MxUs are wavelength-division multiplexing (WDM) PON ONU optical modules and at least some of the PON ONU optical modules of the MxUs are TDM PON ONU optical modules, wherein at least one of the WDM PON ONU optical modules comprises an optical gain medium and is coupled to a WDM filter and a Faraday rotator mirror (FRM), wherein the FRM is coupled to distribution/drop fibers of the power splitter, and wherein the optical gain medium, the WDM filter, and the FRM are coupled to form a self-seeded external cavity fiber laser for a dense WDM (DWDM) uplink wavelength channel.

14. The network system of claim 13, further comprising:
a TDM PON optical line terminal (OLT);
a WDM PON OLT; and
a WDM coupler to couple the TDM PON OLT and the WDM PON OLT to the ODN,
wherein the TDM PON OLT exchanges downstream data and upstream data with TDM PON ONU optical modules at the MxUs using a TDM scheme and burst operation mode, and
wherein the WDM PON OLT exchanges downstream data and upstream data with WDM PON ONU optical modules at the MxUs using a WDM scheme and continuous operation mode.

15. The network system of claim 14, wherein the optical gain medium, the WDM filter, and the FRM are coupled by single modes fibers.

16. The network system of claim 15, wherein the WDM filter comprises a DWDM filter.

17. The network system of claim 16, wherein the WDM filter comprises a DWDM Gaussian filter.

18. The network system of claim 15, wherein the FRM is partially reflective.

19. The network system of claim 14, wherein the self-seeded external cavity fiber laser comprises a transmitter for a DWDM uplink wavelength channel.

20. The network system of claim 13, wherein the optical gain medium comprises a reflective semiconductor optical amplifier (RSOA).

21. The network system of claim 20, wherein the optical gain medium comprises data modulation functions.

22. The network system of claim 21, wherein the optical gain medium comprises a reflective semiconductor optical amplifier (RSOA).

* * * * *